(No Model.)
E. M. BENTLEY.
MEANS FOR REGULATING ALTERNATING CURRENT MOTORS.
No. 522,820. Patented July 10, 1894.
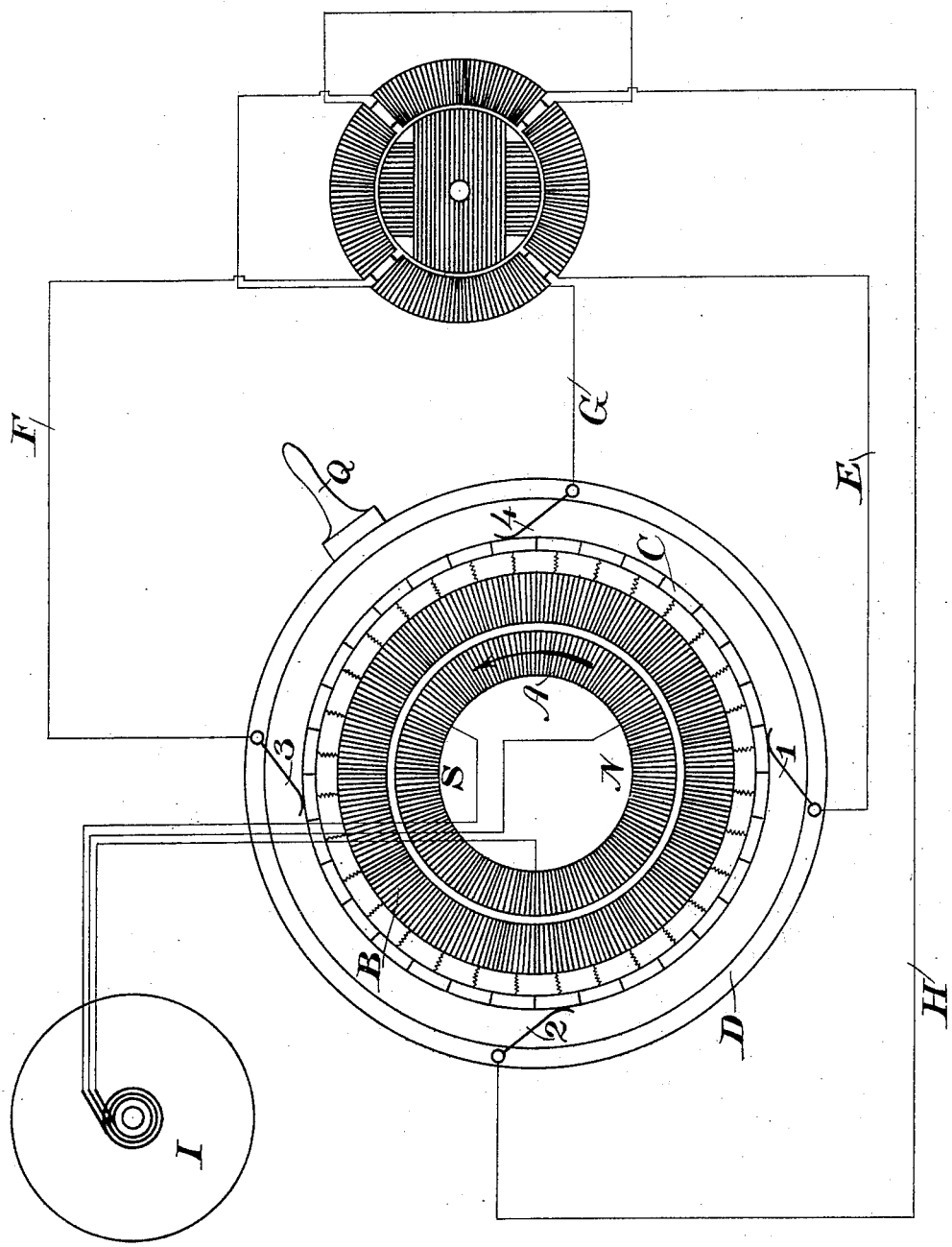
ATTEST
W. H. Bentley
A. C. Kline
INVENTOR
Edward M. Bentley
by Bentley & Blodgett
Attys.

United States Patent Office.

EDWARD M. BENTLEY, OF BOSTON, MASSACHUSETTS, ASSIGNOR TO THE GENERAL ELECTRIC COMPANY, OF SAME PLACE.

MEANS FOR REGULATING ALTERNATING-CURRENT MOTORS.

SPECIFICATION forming part of Letters Patent No. 522,820, dated July 10, 1894.

Application filed April 17, 1893. Serial No. 470,582. (No model.)

*To all whom it may concern:*

Be it known that I, EDWARD M. BENTLEY, a citizen of the United States, residing in Boston, in the county of Suffolk, in the Commonwealth of Massachusetts, have made certain new and useful Improvements in Means for Regulating Alternating-Current Motors, of which the following is a specification:

My invention relates to means for locally changing the phase period of an alternating current and applying such a current for regulating the speed of alternating current motors and has for its object to provide such a means readily controllable and adapted to start the motor or to run it at a constant or variable speed different from that of the generator, should it be so desired. To this end I provide a method and means as herein set out whereby alternating currents having any desired phase period, synchronous with that of the generator or not, may be employed to run the motor, thus permitting wide variations in speed.

The accompanying drawing shows a diagrammatic representation of the method and means employed to effect the objects of my invention.

I employ for the purposes of my invention a transformer between the main line and the motor, the primary of which has a ring shaped core in which the rotation of the magnetic poles is accomplished in a well known manner by multiphase currents. The secondary is substantially a Gramme ring provided with a commutator and the secondary current is taken from this commutator by means of brushes, which are fixed, so long as the motor is receiving currents of the same phase-periods as those in the primary, but which may be rotated in one direction or the other according as it is desired to have the phase periods of the motor current longer or shorter than those in the primary. Thus when it is desired to start the motor or to run at a speed different from that which naturally would be imparted by the line impulses, the brushes above mentioned, may be rotated in either direction at a speed adapted to produce the desired phase periods in the motor circuit.

Referring by letter to the accompanying drawing, I is a diagrammatic representation of a generator adapted to transmit three-phase or other poly-phase currents to the transformer by suitable conductors in a manner well known in the art.

A is the primary of the transformer, which is of ring shape and is provided with three or more connections, so as to take poly-phase alternating currents of any kind which will set up a rotating magnetic field, the poles being supposed in the present case to rotate in the direction of the arrow. The secondary B of the transformer is a similar ring provided with a commutator C, the ring being a closed coil or rather series of coils having connections to the commutator segments in the ordinary way. Upon this commutator rests a series of brushes, 1, 2, 3, 4, secured to the ring or disk D, which is adapted to be rotated in either direction by means of the handle Q.

It is manifest that the number of brushes employed is immaterial to the purposes of my invention. The ring D is the only movable part of the transformer.

Connected to the brushes 1, 2, 3, 4 are mains E, F, G, H, leading to a motor shown diagrammatically herein. As it is manifest that should the rotation of the ring D exceed a limited amount, the wires leading from the brushes would become twisted or broken, any suitable arrangement of connecting the brushes to separate collecting rings upon which bear other brushes adapted to lead off the current to the mains may be adopted; but as this is a mere method of effecting the transmission of the current and does not form an essential feature of my invention, I do not further describe it herein.

With the parts in the position shown in the drawing and two circuits leading respectively from the brushes, 1—3, and 2—4, to corresponding parts of the motor, it will be evident that as the primary current produces a rotation of the poles in the ring A, there will be set up in the two secondary circuits, corresponding alternating currents succeeding each other in the two circuits in a well-known manner; there being a reversal of current in the circuit (from brushes 1—3, for instance) when the poles N and S pass under these brushes, while at the same time the current in the circuit from brushes 2—4, will be at a maximum. It is therefore also evident that if the brushes 1 and 3 be made to pass the poles N and S with greater or less frequency, the phase periods in the secondary circuits would be correspondingly longer or shorter; and this I accomplish by rotating the ring D carrying the brushes by any suitable mechanical means.

If it be desired to shorten the phase periods, I rotate the ring and brushes in a direction opposite to that of the rotation of the magnetic poles; for instance, if the ring D rotates at the same speed as the poles of the primary, but in an opposite direction, the periods of the secondary will be twice as rapid as those of the primary. If, however, the rotation of the ring D be in the opposite direction so that it moves in the same direction with the poles but at a less rate the periods of the secondary will be longer than those of the primary. If the ring D be left stationary the phase periods in both primary and secondary will coincide.

From the above description it will be evident that a motor whose speed depends upon the phase periods of the secondary may be operated at any rate of which it is capable, depending upon the relative speed and direction of rotation of the ring D and the magnetic poles of the primary A.

The ring D may be rotated manually or automatically, as may be desired. Thus, at starting the motor the operator may rotate the ring in the desired direction until the motor is brought into synchronism with the main line, when the brushes may be left stationary and the motor will continue at a synchronized speed, but may be made to rotate at a less or greater rate so long as the rotation of the ring D is continued; which may be effected by means of a belt from the motor working over cone pulleys in ways well understood. It is evident that the same method of changing the phase period of an alternating current, that is by means of a transformer in which the rate of movement of the line of polarity is in effect varied by shifting the points of electrical connection, may be employed wherever it is desirable to employ in translating devices a frequency of alternation greater or less than that which prevails on the main line. It would also be within the spirit of my invention to use as a primary the coils shown in the drawing as a secondary or in any other manner to vary the effective rate of movement of the line of polarity by a variation in the points of electrical connection.

I do not herein claim broadly the method of varying the phase periods of the alternating current, which consists in successively changing the points of line connection around a rotating commutator independently of its own rotation, as this is not my invention, which is limited to the matter herein described and claimed, and particularly to the use of alternating currents, the employing of similar devices and methods in continuous current work not being within the scope of this invention.

Having thus described my invention, what I claim, and wish to protect by Letters Patent of the United States, is—

1. As a means of regulating the speed of an alternating current motor, a transformer provided with a primary adapted to generate a rotating magnetic field and a secondary adapted to co-operate therewith and provided with a commutator connected at suitable intervals to its winding, brushes adapted to take current from the commutator, and means, substantially as described, for rotating the brushes in either direction.

2. As a means of regulating the speed of an alternating current motor, a transformer whose primary has a ring shaped core and a winding thereon adapted to generate a rotating magnetic field, a secondary having a Gramme winding suitably connected to a commutator, brushes resting upon the commutator and carried by a ring adapted to rotate in either direction, and line wires leading from the brushes to an alternating current motor; whereby the rotation of the ring about the commutator may vary the phase period of the current transmitted through the line wires to the motor, substantially as herein described and set out.

3. As a means of regulating alternating current motors, a generator, poly-phase conductors leading therefrom to a transformer, whose primary has a ring shaped core and a winding thereon adapted to generate a rotating magnetic field, and a secondary having a Gramme winding suitably connected to a commutator, brushes resting upon the commutator and carried by a ring adapted to rotate in either direction and line wires leading from the brushes to an alternating current motor; whereby the rotation of the ring about the commutator may vary the phase period of the current transmitted through the line wires to the motor, substantially as herein described and set out.

4. As a means of regulating alternating current motors, a transformer having a primary with a ring shaped core, as A, with poly-phase connections and a winding adapted to generate a rotating magnetic field therein, a secondary consisting of a Gramme ring, as B, provided with a commutator, as C, connected thereto at suitable intervals and brushes, as 1, 2, 3, 4, bearing upon the commutator and carried by a ring, as D, adapted to rotate about the commutator and leads as E, F, G, H carrying current from the brushes to a motor; whereby the rotation of the ring in one direction lengthens the phase periods in the motor circuit and its rotation in the opposite direction shortens such periods.

5. The method of changing the relative phase-periods of primary and secondary alternating currents which consists of passing